United States Patent [19]
Epworth

[11] Patent Number: 5,080,505
[45] Date of Patent: Jan. 14, 1992

[54] OPTICAL TRANSMISSION SYSTEM

[75] Inventor: Richard E. Epworth, Bishop's Stortford, United Kingdom

[73] Assignee: STC PLC, London, England

[21] Appl. No.: 636,198

[22] Filed: Dec. 31, 1990

[30] Foreign Application Priority Data

Jan. 23, 1990 [GB] United Kingdom ............... 9001571

[51] Int. Cl.⁵ .............................................. G02B 6/42
[52] U.S. Cl. ..................................... 385/24; 359/154; 359/173
[58] Field of Search .................... 350/96.15, 96.29; 455/610, 612

[56] References Cited

U.S. PATENT DOCUMENTS

| | | | |
|---|---|---|---|
| 4,680,809 | 7/1987 | Hartkopf et al. | 350/96.15 X |
| 4,834,481 | 5/1989 | Lawson et al. | 350/96.15 |
| 4,963,832 | 10/1990 | Desurvire et al. | 350/96.15 X |
| 4,973,169 | 11/1990 | Slonecker | 350/96.29 X |

Primary Examiner—Frank Gonzalez
Assistant Examiner—Phan T. Heartney
Attorney, Agent, or Firm—Lee, Mann, Smith, McWliams & Sweeney

[57] ABSTRACT

In an optical fiber transmission system, signals are transmitted along a fiber optic path (11) in the form of substantially dispersion-free solitons. The transmission path includes a number of optical amplifiers (12) each of which determines, from the transmitted soliton signal purity, a gain control signal which is fed back to a previous amplifier in the path. This ensures soliton purity and optimizes the transmission power.

6 Claims, 2 Drawing Sheets

OPTICAL TRANSMISSION SYSTEM

This invention relates to optical transmission systems, e.g. for data or telecommunications applications, and in particular to systems operating at high bit rates over long unrepeatered fibre optic links.

BACKGROUND OF THE INVENTION

A major problem in the long distance transmission of optical signals over an optical fibre path is that of dispersion of the transmitted signal. Dispersion arises from differences in the velocity of the various frequency and/or modal components of the signal within the transmission medium. This effect causes broadening of the component pulses of a signal and thus limits the distance over which signals may be transmitted before regeneration becomes necessary. The problem can be reduced by an appropriate choice of transmission frequency or wavelength It has been found that, for a silica optical fibre there is a wavelength at which the signal dispersion has a minimum (non-zero) value. Transmission of signals at this frequency results in some improvement but is by no means sufficient to allow transmission over very long distances. Conventionally this problem is addressed by providing repeaters at regular intervals along the fibre optic path. A typical repeater provides regeneration and retiming of the optical signal and may also provide a supervisory function e.g. for error checking. Thus, the conventional repeater is a complex and somewhat costly device Further, because such a repeater is designed to be compatible with the system signalling format and bit rate, a system provided with such repeaters cannot subsequently be upgraded, e.g. to a higher bit rate, without considerable inconvenience and expense. Indeed, for a submarine system where recovery and replacement of repeaters is impractical, subsequent system upgrading may be impossible.

In an attempt to overcome this problem it has been proposed that optical signals be transmitted in a soliton format. A soliton is a solitary wave or pulse that propagates over very long distances with substantially no deterioration. The generation of optical solitons has been described by L. Mollenauer & K. Smith in "Demonstration of Soliton Transmission over more than 4,000 Km in fibre with loss periodically compensated by Raman gain" Optical Letters, 13 (1988) page 675.

A significant problem in the transmission of an optical signal in a soliton format is that of amplitude control. Soliton transmission via an optical fibre path requires a precise signal amplitude which depends on the fibre dispersion characteristics and on its effective cross-section. Departure from this amplitude results in a reduction of soliton purity with a consequent loss of dispersion-free transmission.

An object of the invention is to minimise or to overcome this disadvantage.

A further object of the invention is to provide an improved fibre optic transmission system.

One solution to the problem of long distance soliton transmission is proposed in our co-pending application No. 89 25818 0 (K.C. Byron 40) This describes a method of eliminating soliton-type interaction in an optical fibre communications system comprising the step of causing the optical fibre to appear, to a signal to be transmitted thereby, to be a passive optical pipe.

The present invention provides an alternative approach to the problem of soliton transmission.

SUMMARY OF THE INVENTION

According to one aspect of the present invention there is provided a fibre optic transmission system, including a fibre optic path, optical amplifying means disposed at intervals along said path, a transmitter adapted to launch optical solitons into said path, and a receiver arranged to receive said solitons from the path, wherein each said amplifying means includes means for deriving from the characteristics of the transmitted solitons a signal whereby to control the soliton amplitude such that substantially pure soliton transmission is effected.

According to another aspect of the invention there is provided a method of fibre optical transmission of an information signal, the method including generating a sequence of optical soliton pulses corresponding to the information signals, transmitting the soliton pulse over a fibre optic path, amplifying the soliton pulses at stages along said path, and deriving from the soliton characteristics at each amplifier stage a feedback gain control sign for a previous amplifier stage whereby the degree of amplification at each said interval is controlled so as to provide substantially pure soliton transmission.

According to a further aspect of the invention there is provided an amplifier device for a fibre optic soliton transmission system, said device including an optical amplifier, means for analysing received soliton signals and for transmitting to a similar amplifier device a feedback gain control signal indicative of the deviation of said received soliton signals from a pure soliton format, and means for receiving a feedback gain control signal from a further similar amplifier device so as to control the amplifier gain whereby to provide a gain value at which substantially pure soliton transmission is effected.

The technique is particularly adapted, but not exclusively, to long haul submarine optical systems where the replacement of conventional repeaters by broadband optical amplifiers results in a significant cost reduction. The technique ensures soliton purity and optimises the transmission power.

BRIEF DESCRIPTION OF THE DRAWINGS

An embodiment of the invention will now be described with reference to the accompanying drawings in which.

DESCRIPTION OF PREFERRED EMBODIMENT

Figure 1:
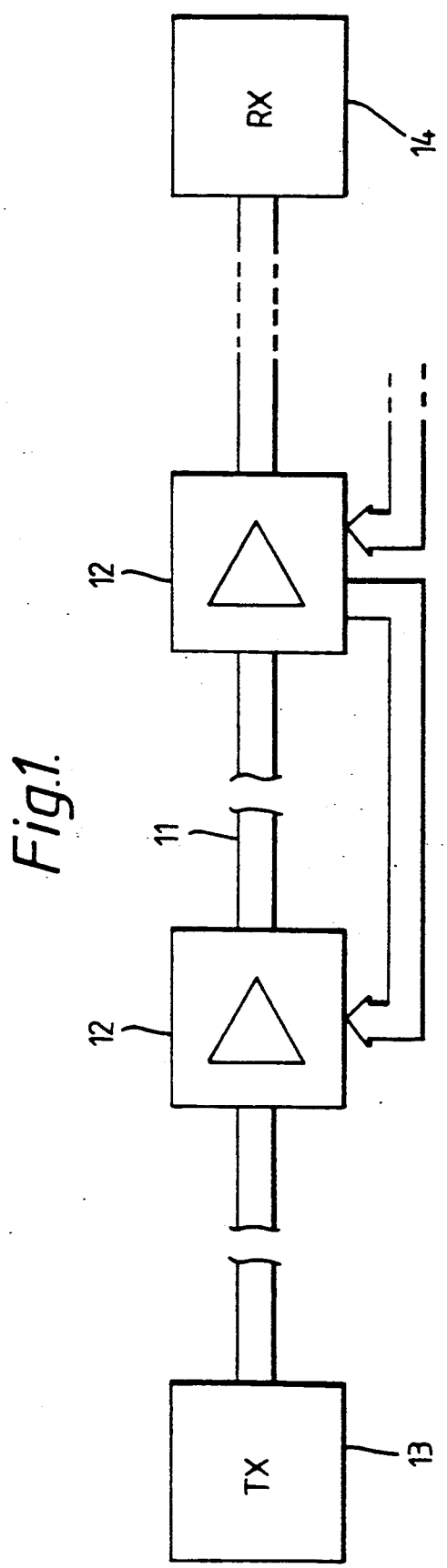
FIG. 1 is a schematic diagram of an optical transmission system.

Referring to FIG. 1 of the drawing, the optical transmission system includes a fibre optic path 11, typically a submarine fibre optic cable, which is provided at intervals with amplifiers 12. Typically the distance between amplifiers is of the order of 20 kilometers. A transmitter 13 is coupled to one (input) end of the fibre optic path 11 and a receiver 14 is coupled to the other (output) end of the path. The transmitter is adapted to launch optical signals corresponding to input data signals in a soliton format into the path 11. These signals are preferably of a frequency corresponding to the minimum dispersion frequency for the fibre medium and are in the form of very short duration pulses Typically the pulse length is one picosecond or less. The shape of each pulse should correspond to that of the $sech^2$ function to provide the format for soliton transmission. The solitons propagate in a substantially dispersion-free manner along the fibre optic path, the amplitude of each soliton being controlled such that substantially pure soliton transmission is achieved. Because the soliton pulses are of such short duration, there is an effective separation between successive soliton pulses even at high bit rates of transmission. Each amplifier 12 provides a feedback signal whereby to control the gain of the preceding amplifier in the transmission path.

Figure 2:
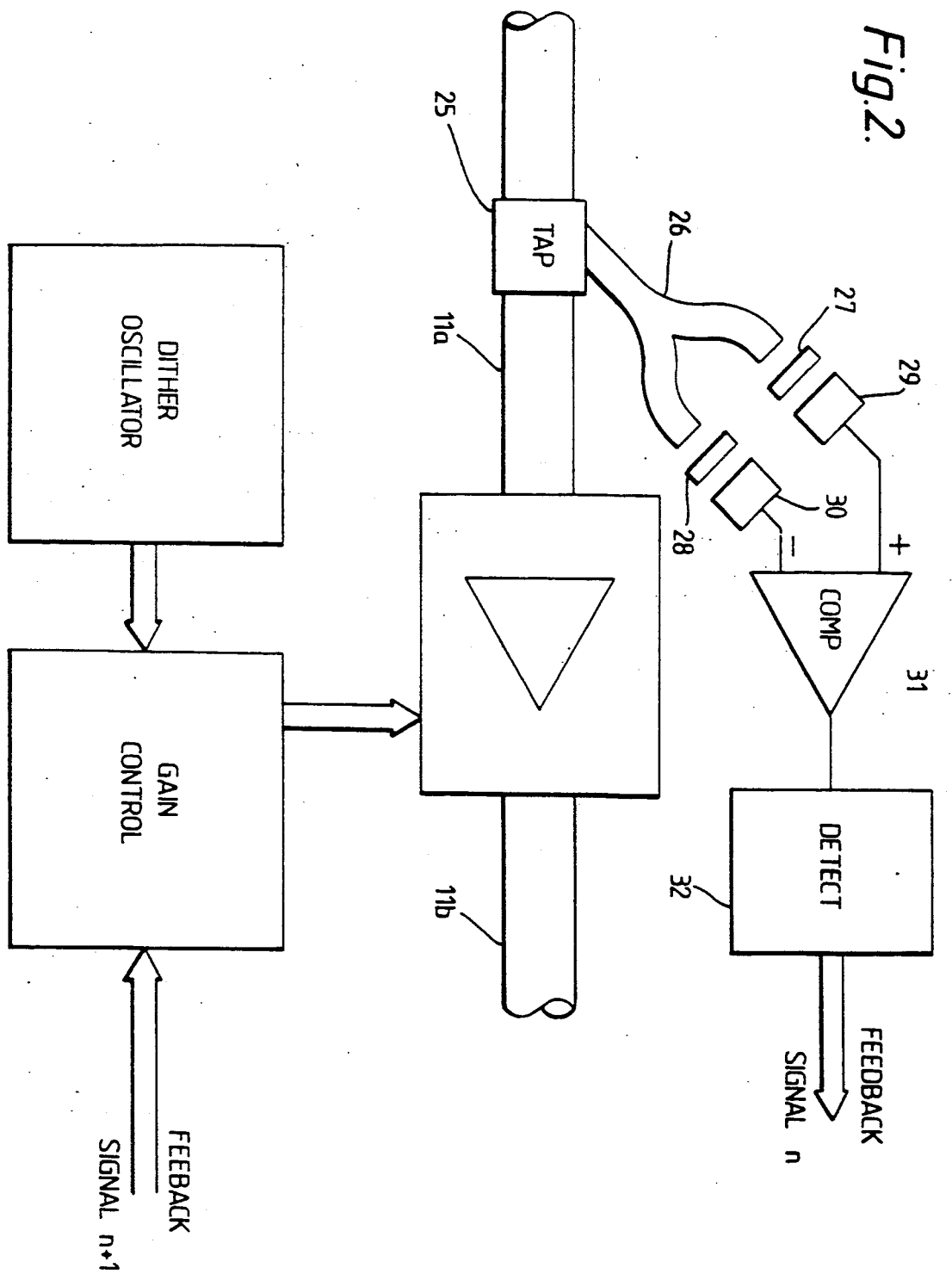
FIG. 2 is a schematic diagram of an amplifier device for the system of FIG. 1.

FIG. 2 illustrates, in highly schematic form, an amplifier arrangement for use in the transmission system of FIG. 1. As shown in FIG. 2, the amplifier arrangement includes an optical amplifier 21, e.g. a pumped amplifying fibre section, and an associated gain control circuit 22 whereby the amplifier gain is controlled so as to ensure that transmitted pulses remain in the soliton format. The gain control circuit 22 receives a feedback signal from the next (downstream) amplifier in the system. The amplifier also provides a control signal from the preceding (upstream) amplifier in the system. The amplifier gain 22 is provided with a relatively low frequency dither, e.g a sinusiodally varying input, superposed on the feedback signal and generated locally by an oscillator 23 The purpose of this dither of the amplifier gain will be described below. The feedback signal for the preceding amplifier of the system is derived by determining the magnitude of the departure of the received pulse from the pure soliton format In the amplifier arrangement of FIG. 2 this is achieved by analysis of a tapped-off portion of the transmitted signal A tap 25 extracts a small portion of the transmitted signal from the input fibre 11a. This tapped signal is then analysed to determine, either directly or indirectly, the magnitude of its departure from the pure soliton format. In the arrangement of FIG. 2 an indirect optical technique is employed. The tapped signal is fed via a splitter 26 to first and second filters 27, 28 having different pass bands. Each filter 27, 28 is associated with a respective photodetector 29, 30 the outputs of which are coupled to the inputs of a comparator 31 the output of which provides a measure of the frequency characteristics of the soliton pulses and hence their purity.

It will be appreciated that deviation from the soliton purity will occur when the amplifier gain is either too high or too low. Thus the comparator output signal providing a measure of this deviation is ambiguous. To remove this ambiguity the comparator output is fed to a synchronous detector 32 tuned to the frequency of the dither introduced to the received signal by the oscillator of the previous amplifier in the transmission path. By determining the sense of the slope of the signal deviation from soliton purity with respect to the dither signal, the detector 32 determines the appropriate feedback signal to increase or decrease the gain of the previous amplifier. This ensures that each amplifier of the system has a gain value range centered on that value which results in substantially pure soliton transmission.

It will be appreciated that as the system of FIGS. 1 and 2 are not restricted to any particular bit rate nor to any particular form of signal coding, it is readily amenable to future updating e.g. by operating at a higher bit rate and/or a narrower pulse width.

I claim:

1. A fibre optic transmission system in which information is transmitted in the form of sequences of optical soliton pulses, the system including a fibre optic path along which, in use, the soliton pulses are transmitted, optical amplifying means disposed at intervals along said path, a transmitter adapted to launch optical solitons into said path, and a receiver arranged to receive said solitons from the path, wherein each said amplifying means includes means for deriving from the characteristics of the transmitted soliton, a feedback signal for at least one other said amplifying means whereby to control the soliton amplitude and format throughout the path such that substantially pure soliton transmission is effected.

2. A fibre optic transmission system in which information is transmitted in the form of sequences of optical soliton pulses, the system including a fibre optic path along which, in use, the soliton pulses are transmitted, optical amplifying means disposed at intervals along said path, and a receiver arranged to receive said solitons from the path, wherein each said amplifying means includes an optical amplifier, wherein each said amplifying means includes means for measuring the deviation of each soliton pulse from a pure soliton format whereby to derive a corresponding amplifier gain control feedback signal for a preceding amplifying means in said path, and wherein each said amplifying means further includes means receiving a said gain control signal from a succeeding amplifier in said path whereby to control the gain of each said amplifier too a value at which substantially pure soliton transmission is effected throughout the optical path.

3. A transmissionn system as claimed in claim 2, wherein said means for measuring the deviation of each soliton pulse from a pure soliton format includes first and second detectors responsive to different optical wavelengths and coupled to a comparator whereby the gain control signal is derived.

4. A transmissionn system as claimed in claim 2 or 3, wherein the gain control signals are transmitted over a supervisory channel.

5. A method of fibre optical transmission of an information signal, the method including generating a sequence of optical soliton pulses corresponding to the information signal, transmitting the soliton pulses over a fibre optic path, amplifying the soliton pulses at stages along said path, and deriving from the soliton characteristics at each amplifier stage a feedback gain control signal for a previous amplifier stage whereby the degree of amplification at each said interval is controlled so as to provide substantially pure soliton transmissionn throughout the optical path.

6. A method of fibre optic transmission as claimed in claim 5, wherein said amplification control is determined by measurement of deviation of the transmitted solitons from a pure soliton format.

* * * * *